(12) United States Patent
Ota et al.

(10) Patent No.: US 8,174,190 B2
(45) Date of Patent: May 8, 2012

(54) DISPERSION LIQUID FOR NEAR-INFRARED-ABSORBING ADHESIVE-BODY, NEAR-INFRARED-ABSORBING ADHESIVE BODY, NEAR-INFRARED-ABSORBING PLASMA-DISPLAY-PANEL FILTER, AND PLASMA DISPLAY PANEL

(75) Inventors: Yosuke Ota, Chiba (JP); Atsushi Tofuku, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 76 days.

(21) Appl. No.: 12/289,788

(22) Filed: Nov. 4, 2008

(65) Prior Publication Data

US 2009/0116100 A1 May 7, 2009

(30) Foreign Application Priority Data

Nov. 6, 2007 (JP) .................................. 2007-289087

(51) Int. Cl.
*H01J 17/49* (2012.01)

(52) U.S. Cl. ...................................................... 313/528

(58) Field of Classification Search ........... 313/582–587
See application file for complete search history.

(56) References Cited

U.S. PATENT DOCUMENTS

| 2002/0009667 A1* | 1/2002 | Nishimura et al. ........ 430/270.1 |
| 2005/0003081 A1* | 1/2005 | Nakano et al. ................ 427/160 |

FOREIGN PATENT DOCUMENTS

| JP | A-2000-323891 | 11/2000 |
| JP | A-2005-023133 | 1/2005 |
| JP | A-2006-154516 | 6/2006 |
| JP | A-2006-201463 | 8/2006 |

\* cited by examiner

*Primary Examiner* — Toan Ton
*Assistant Examiner* — Hana Featherly
(74) *Attorney, Agent, or Firm* — Oliff & Berridge, PLC

(57) ABSTRACT

To improve an optical property of a near-infrared-absorbing PDP filter and suppress a manufacturing cost. The present invention provides a dispersion liquid for near-infrared-absorbing adhesive-body. The dispersion liquid includes, in a solvent, one or more types of nanoparticles selected from a tungsten oxide nanoparticle and a composite tungsten oxide nanoparticle, and an acryl-based polymer dispersant is added to the dispersion liquid. The average dispersed nanoparticle diameter of the tungsten oxide nanoparticles and the composite tungsten oxide nanoparticles is equal to or smaller than 800 nm.

11 Claims, 1 Drawing Sheet

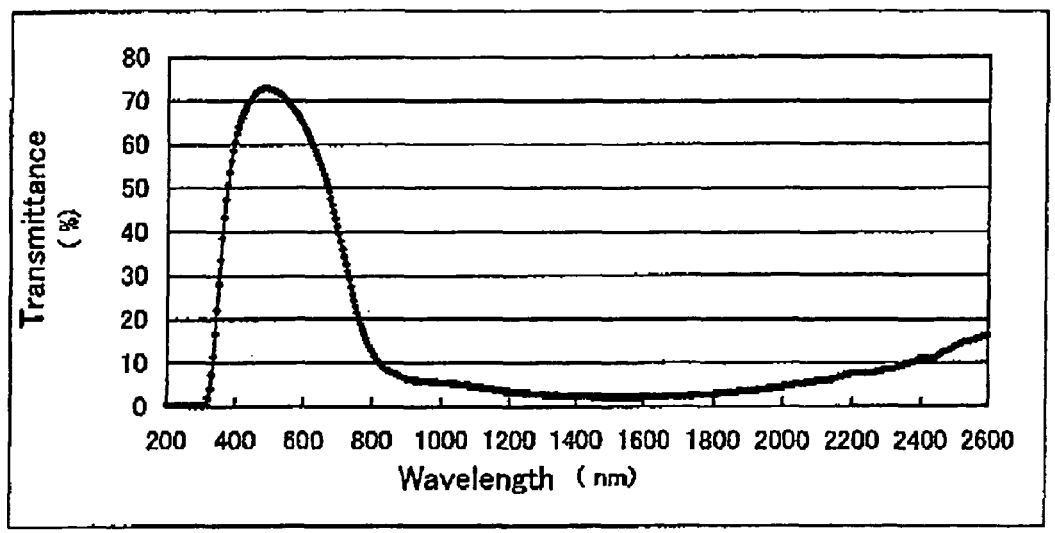

DISPERSION LIQUID FOR NEAR-INFRARED-ABSORBING ADHESIVE-BODY, NEAR-INFRARED-ABSORBING ADHESIVE BODY, NEAR-INFRARED-ABSORBING PLASMA-DISPLAY-PANEL FILTER, AND PLASMA DISPLAY PANEL

TECHNICAL FIELD

The present invention relates to a dispersion liquid for near-infrared-absorbing adhesive-body which is used for a near-infrared-absorbing plasma-display-panel filter having near-infrared shielding performance: a near-infrared-absorbing adhesive-body; and a near-infrared-absorbing plasma-display-panel filter using these; and a plasma display panel (hereinafter also referred to as PDP) using the near-infrared-absorbing plasma-display-panel filter.

BACKGROUND

Recently, PDPs are gaining attention as displays are getting larger in width and height and getting thinner. A PDP generates an electric discharge in a gas mainly composed of rare gas, particularly, xenon sealed in the panel, thereby to cause a single light body provided in a cell in the panel to emit light. At this time, a part of near-infrared rays and electromagnetic waves generated at plasma discharge in xenon gas atmosphere is radiated to the front surface of the PDP. Such radiation, particularly of a near-infrared ray in the wavelength region from 800 nm to 1100 nm causes problems such as malfunction of cordless telephones or remote control of electrical household appliances, a negative impact on transmission system optical communications, a negative impact on human bodies due to electromagnetic wave, or the like. Accordingly, in order to prevent the above-described problems, a laminated body having a near-infrared ray shielding effect and an electromagnetic shielding effect is provided on the front surface of the PDP.

A near-infrared-absorbing material is added in a laminated body having the above-described near-infrared ray shielding effect. It is desired that the near-infrared-absorbing material adequately transmit light in the visible light range (the wavelength region from approx. 380 nm to 780 nm) so as not to negatively affect luminance of the PDP, and shield a near-infrared ray in the wavelength region from 800 nm to 1100 nm. Conventionally, an organic dye or a metal complex is used as the near-infrared-absorbing material. Use of a filter containing multiple types of the near-infrared-absorbing materials or a multi-layer filter containing various types of near-infrared-absorbing materials in a plurality of layers is proposed.

In such proposals, in the case where an organic compound or a metal complex is contained in a multi-layer filter, a method of coating a substance in which an organic compound or a metal complex is uniformly dispersed in the solvent onto a base material on the PDP surface is commonly used. As a near-infrared absorbent such as an organic compound, a metal complex or the like a diimonium-based compound, an aminium-based compound, a phthalocyanine-based compound, an organic metal complex, a cyanine-based compound, an azo compound, a polymethine-based compound, a quinone-based compound, a diphenylmethane-based compound, a triphenylmethane-based compound are cited. However, such a near-infrared absorbent such as an organic compound, a metal complex or the like is inferior in durability against heat and light. Accordingly, when the organic compound or the metal complex is used as a near-infrared absorbent, it was difficult to maintain near-infrared-absorbing performance for a long period of time.

Further, poor durability of the above-described near-infrared absorbent makes it difficult to provide a layer with a near-infrared ray shielding function in the vicinity of the surface of the visible surface side of the near-infrared-absorbing PDP filter which is susceptible to the influence of an external environment. To address this, in a conventional art, an independent layer is established on the visible surface side in contact with the base material or on the PDP adhesion side, and the layer is caused to have the near-infrared shielding function, whereby durability performance is ensured. However, such structural constraint increases in the number of laminated layers of the near-infrared-absorbing PDP filter, and leads to decreased productivity and increased costs.

Under the above-described circumstance, for example, Patent Document 1 proposes a near-infrared-absorbing PDP filter in which tungsten oxide microparticles or/and a composite tungsten oxide microparticles are dispersed, as an inorganic near-infrared absorbent with excellent weather resistance, in a coating film made of a resin or a metallic oxide provided in or/and on the surface of the base material.

Patent Document 2 proposes an antireflection film, in which a tungsten oxide-based compound is used as a near-infrared absorbent, a hard coat layer containing a cured resin and a near-infrared absorbent and a low refractive-index layer containing a cured resin is sequentially laminated on one of the sides of a base material film. In addition, transmittance of the antireflection film is made to be equal to or less than 30% at least in the entire wavelength region from 850 to 1000 nm. The proposed antireflection film has near-infrared-absorbing performance and anti-reflection performance, has abrasion-resistance, has a simple layer structure, and is manufactured at a low cost and obtained by the wet process method which is particularly preferable for PDP.

In addition, in order to obtain a laminated body having the above-described the electromagnetic shielding function, a method of providing a conductive layer which shields electromagnetic wave on the base material surface is employed. For example, a method of laminating multiple conductive thin films of a metal/a metallic oxide on the base material surface, a method of forming a thin film layer made of metallic foil such as copper and etching the thin film layer into a mesh-like shape, and the like are cited. In the case where the above-described mesh-like metal layer or the above-described metal-containing layer is used, the base material surface on which the mesh is provided is rough. Accordingly, there are some cases where a transparent resin layer is provided to fill the gap thereof, thereby to improve transparency of the optical filter. For example, Patent Document 3 discloses a display. An adhesive agent layer is laminated on a transparent base material, and an electromagnetic shielding adhesive film which is formed by embedding a geometrically-shaped conductive layer onto the adhesive agent layer is adhered to a plastic plate so as to configure an electromagnetic shielding structure body. The electromagnetic shielding adhesive film or the electromagnetic shielding structure body is used for the front surface of the display such as for a CRT, a PDP, a liquid crystal, an EL or the like.

In addition, as the display is getting larger, demand for weight reduction and thinning will be further increased also for PDP. At the same time, improvement of impact resistance of the panel has become an important challenge. Accordingly, for example, Patent Document 4 proposes providing an impact mitigation layer for mitigating an impact from the visual field surface side, in addition to the above-described near-infrared ray shielding layer and the electromagnetic shielding layer.
[Patent Document 1] Japanese Patent Application Laid-Open No-2006-154516
[Patent Document 2] Japanese Patent Application Laid-Open No. 2006-201463
[Patent Document 3] Japanese Patent Application Laid-Open No. 2000-323891
[Patent Document 4] Japanese Patent Application laid-Open No. 2005-023133

DISCLOSURE OF THE INVENTION

Problem to be Solved by the Invention

In order to satisfy the required characteristics as described above, a functional multiple-layered film has become the main stream of a near-infrared-absorbing PDP filter. The functional multiple layered film is manufactured by creating a near-infrared ray shielding layer, an electromagnetic shielding layer, an external force absorbing layer and the like separately, and by adhering the individual layers with an adhesive agent or the like so as to make a composite. However, according to the study by the present inventors, a functional multilayer film has caused a problem that decreased transparency of the filter due to multiple layers affect luminance of the screen, a problem that decreased productivity increase cost, or the like.

The present invention has been made in consideration of the above-described problems. An object of the present invention is to improve an optical property of the near-infrared-absorbing PDP filter and to suppress a manufacturing cost.

Means for Solving Problems

The present inventors conducted researches in order to solve the above-described problems and have conceived a breakthrough idea that an inorganic near-infrared absorbent with excellent weather resistance is contained in an adhesive layer of a near-infrared-absorbing PDP filter.

Then, the present inventors conducted further researches to actualize the breakthrough idea. As a result of this, they have gained knowledge that use of a dispersion liquid containing, in a solvent, one or more types of oxide nanoparticles selected from a tungsten oxide nanoparticle and a composite tungsten oxide nanoparticle and an acryl-based polymer dispersant enables uniform dispersion of the nanoparticles in an acrylic ester-based adhesive resin having a carboxyl group. Further, based on the knowledge, the inventors were able to obtain an adhesive body in which one or more types of nanoparticles selected from the tungsten oxide nanoparticle and the composite tungsten oxide nanoparticle are uniformly dispersed. The inventors have found that use of the adhesive body enables improvement of weather resistance of a near-infrared-absorbing PDP filter and reduction in the number of laminated layers, thereby to achieve improved optical property and reduced manufacturing cost simultaneously. As a result, the inventors have reached the present invention.

Specifically, the first invention to solve the above-described problems provides:
a dispersion liquid for near-infrared-absorbing adhesive-body including: in a solvent, one or more types of oxide nanoparticles selected from a tungsten oxide nanoparticle and a composite tungsten oxide nanoparticle; and an acryl-based polymer dispersant, wherein the average dispersed nanoparticle diameter of the oxide nanoparticles is equal to or smaller than 800 nm.

The second invention provides:
the dispersion liquid for near-infrared-absorbing adhesive-body according to the first invention, wherein the solvent has one or more types of solvents selected from ketones, esters, hydrocarbons and ethers.

The third invention provides:
the dispersion liquid for near-infrared-absorbing adhesive-body according to the first invention, wherein the tungsten oxide nanoparticle is a nanoparticle of a tungsten oxide expressed by the general formula WyOz (where W denotes tungsten and O denotes oxygen, $2.2 \leq z/y \leq 2.999$).

The fourth invention provides:
the near-infrared-absorbing adhesive-body according to the first invention, wherein the composite tungsten oxide nanoparticle is a nanoparticle of a composite tungsten oxide expressed by the general formula MxWyOz (where the element M denotes one or more types of elements selected from H, He, alkali metals, alkaline earth metals, rare-earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi and I, where W denotes tungsten and O denotes oxygen, $0.001 \leq z/y \leq 1.1$, $2.2 \leq z/y \leq 3.0$).

The fifth invention provides:
the dispersion liquid for near-infrared-absorbing adhesive-body according to any one of the first to fourth inventions, wherein the tungsten oxide nanoparticle contains a Magneli phase with a relative proportion expressed by the general formula WyOz (where W denotes tungsten and O denotes oxygen, $2.45 \leq z/y \leq 2.999$).

The sixth invention is
a near-infrared-absorbing adhesive-body wherein the dispersion liquid according to any one of the first to fifth inventions is dispersed in an adhesive resin.

The seventh invention provides:
the near-infrared-absorbing adhesive-body according to the sixth invention, wherein the adhesive resin includes an acrylic ester-based skeleton and has a carboxyl group as a functional group.

The eighth invention provides:
a near-infrared-absorbing plasma-display-panel filter, including: one or more types of layers selected from an adhesive layer and an external force absorbing layer made of the near-infrared-absorbing adhesive-body according to the sixth or seventh invention, between a base material and a laminated body provided with a functional multi-layered film on a surface of the base material, or between laminated bodies each of which is provided with a functional multi-layered film on a surface of the base material.

The ninth invention provides:
a near-infrared-absorbing plasma-display-panel filter, including a mesh-like metal layer having an the electromagnetic shielding function in one or more types of the layers selected from the adhesive layer and the external force absorbing layer according to the eighth invention.

The tenth invention provides:
a plasma display panel including the near-infrared-absorbing plasma-display-panel filter according to any one of the eighth or ninth invention.

Effect of the Invention

In a PDP panel, an infrared red absorbing adhesive body in which a dispersion liquid for near-infrared-absorbing adhesive-body according to the present invention is dispersed in an adhesive resin is used as an adhesive layer of a near-infrared-absorbing PDP filter. The PDP panel is excellent in optical property and weather resistance and has enabled reduction of the manufacturing cost.

BEST MODE FOR CARRYING OUT THE INVENTION

Hereinafter, an embodiment of the present invention will be described in detail.

A dispersion liquid for near-infrared-absorbing adhesive-body according to the present invention contains, in a solvent, one or more types of oxide nanoparticles selected from a tungsten oxide nanoparticle and a composite tungsten oxide nanoparticle, and an acryl-based polymer dispersant. The dispersion liquid for near-infrared-absorbing adhesive-body is capable of uniformly dispersing nanoparticles in an adhesive body using an adhesive resin which includes an acrylic ester-based skeleton and which has a carboxyl group as the functional group. Further, the adhesive body in which the dispersion liquid for near-infrared-absorbing adhesive-body is uniformly dispersed can be preferably used in a near-infrared-absorbing PDP filter and a PDP panel.

Note that, in the term "adhesive body" of the present invention, both a mixture by mixing the adhesive resin with the dispersion liquid related to the present invention and a body after the mixture is heat-treated are included.

1. Dispersion Liquid for Near-Infrared-Absorbing Adhesive-Body

The dispersion liquid for near-infrared-absorbing adhesive-body according to the present invention contains, in 4 to 89 parts by weight of a solvent, 10 to 80 parts by weight of one or more types of oxide nanoparticles selected from a tungsten oxide nanoparticle and a composite tungsten oxide nanoparticle, and 1 to 40 parts by weight of the acryl-based polymer dispersant. Further, the average dispersed nanoparticle diameter of the tungsten oxide nanoparticles or the composite tungsten oxide nanoparticles is equal to or smaller than 800 nm.

a) Solvent

The solvent to be used in the above-described dispersion liquid should preferably not inhibit fine grinding of the tungsten oxide nanoparticle or the composite tungsten oxide nanoparticle as described above. In addition, an adhesive resin which uniformly disperses the dispersion liquid according to the present invention requires excellent adhesion property. Accordingly, the cross-linking reaction is performed in which after a laminated body containing an adhesive resin layer is formed, a carboxyl group, a hydroxyl group or the like within the skeleton of the adhesive resin is hydrolyzed by means a curing agent so that the adhesive resins are linked with each other. Therefore, a solvent used for the above-described dispersion liquid should preferably not contain a carboxyl group or a hydroxyl group which inhibits the cross-linking reaction. From this point of view, as solvent, one or more types of substances selected from ketones, esters, hydrocarbons, and ethers are cited. As concrete examples, ketones such as methylethyl ketone, and methyl isobutyl ketone; esters such as ethyl acetate, propyl acetate, isopropyl acetate, butyl acetate, isobutyl acetate, propylene glycol monomethyl ether acetate, and propylene glycol monoethyl ether acetate; hydrocarbons such as toluene and xylene; and ethers such as ethyl ether, and isopropyl ether are cited. Among them, ketones and esters are more preferable since they are low in hazardousness and toxicity, and easy to handle.

b) Inorganic Near-Infrared-Absorbing Material

As a near-infrared-absorbing material contained in the dispersion liquid for near-infrared-absorbing adhesive-body, an inorganic near-infrared-absorbing material is preferable which has excellent weather resistance compared with an organic compound or a metal complex.

As an inorganic near-infrared-absorbing material, one or more types of nanoparticles selected from a tungsten oxide nanoparticle and a composite tungsten oxide nanoparticle that effectively function as a near-infrared-absorbing component. Specifically, a nanoparticle of a tungsten oxide expressed by the general formula WyOz (where W denotes tungsten and O denotes oxygen, $2.2 \leq z/y \leq 2.999$) is preferable. A nanoparticle of a composite tungsten oxide expressed by the general formula MxWyOz (where the element M denotes one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Get Sn, Pb, Sb, B, F, P, S, Se, Br, Te, Ti, Nb, V, Mo, Ta, Re, Be, Hf, Os, Bi and I, W denotes tungsten and O denotes oxygen, $0.001 \leq x/y \leq 1.1$, $2.2 \leq z/y \leq 3.0$) is more preferable.

As examples of the tungsten oxide nanoparticles expressed by the general formula WyOz ($2.2 \leq z/y \leq 2.999$), for example, $W_{18}O_{49}$, $W_{20}O_{58}$, $W_4O_{11}$ and the like can be cited. In the case where the value z/y is equal to or greater than 2.2, it is possible to completely avoid emergence of a crystal phase $WO_2$ which is not the original intent in the heat-ray absorbing material, and also it is possible to obtain chemical stability of the material. In the meantime, in the case where the value z/y is equal to or less than 2.999, an adequate amount of free electrons are generated, and thus the near-infrared-absorbing material will become very productive. Further, a WyOz compound which falls in the z/y range $2.45 \leq z/y \leq 2.999$ is a compound so-called Magneli phase and has excellent durability.

A composite tungsten oxide nanoparticle expressed by the above-described general formula MxWyOz has excellent durability in the case where it has a hexagonal, tetragonal, or cubical crystal architecture. Accordingly, the composite tungsten oxide nanoparticle should preferably contain at least one of crystal architectures selected from a hexagonal crystal, a tetragonal crystal and a cubical crystal. For example, in the case of a composite tungsten oxide nanoparticle having a hexagonal crystal architecture, a composite tungsten oxide nanoparticle containing one or more types of elements selected from elements Cs, Rb, K, Ti, In, Ba, Li, Ca, Sr, Fe and Sn can be cited as a preferable element M.

At this time, an addition amount x of the element M to be added is preferably not less than 0.001 and not more than 1.1 in the x/y value. More preferably, the addition amount x should be in the vicinity of 0.33. This is because the x/y value which is theoretically calculated from a hexagonal crystal architecture is 0.33, and a preferable optical property can be obtained at an addition amount in the vicinity thereof. On the other hand, the amount Z of existing oxygen is preferably not less than 2.2 and not more than 3.0 in the z/y value. As typical examples, $Cs_{0.33}WO_3$, $Rb_{0.33}WO_3$, $K_{0.33}WO_3$, $Ba_{0.33}WO_3$ and the like can be cited. However, an effective near-infrared-absorbing property can be obtained, as long as x, y and z are within the above-described ranges.

The tungsten oxide nanoparticle and the composite tungsten nanoparticle which have been so far explained may be used independently. However, it is also preferable that they be mixed for use.

In the case where at least one type of the oxide nanoparticles selected from the tungsten oxide nanoparticle and the composite tungsten oxide nanoparticle is used for the dispersion liquid for near-infrared-absorbing adhesive-body, the average dispersed nanoparticle diameter need be equal to or smaller than 800 nm, preferably equal to or smaller than 200 nm, and more preferably equal to or smaller than 100 nm. It is preferable that the average dispersed nanoparticle diameter of the oxide nanoparticle be equal to or smaller than 800 nm. Because, since a light ray in the visible light wavelength region from 380 nm to 780 nm will not be scattered by geometrical scattering or Mie scattering, a near-infrared-absorbing PDP filter created by using the dispersion liquid for near-infrared-absorbing adhesive-body will not appear like a fogged glass, and accordingly a clear screen display can be obtained. If the average dispersed nanoparticle diameter becomes equal to or smaller than 200 nm, geometrical scattering or Mie scattering is reduced and turned into the Rayleigh scattering region. In the Rayleigh scattering region, the scattering light is reduced in inverse proportion to the sixth power of the average dispersed nanoparticle diameter. Accordingly, the scattering of visible light is reduced, which enables a clear screen display. Further, it is very referable in the case where the average dispersed nanoparticle diameter becomes equal to or smaller than 100 nm, since the amount of the scattering light becomes very small.

c) Dispersant

Examples of the dispersants include a surfactant which disperses and stabilizes nanoparticles by forming a micelle or a reverse-micelle, a polymer dispersant which disperses and stabilizes nanoparticles through steric hindrance of the dispersant adsorbed onto the nanoparticle surface, or the like. Among these, a polymer dispersant which can maintain dispersing quality in an adhesive body from which the solvent is reduced during the cross-linking reaction is preferable.

As the polymer dispersant to be added to the dispersion liquid for near-infrared-absorbing adhesive-body, an acryl-based polymer dispersant should be preferably used. As the acryl-based polymer dispersant, for example, a substance which has a co-polymer of ethyl acrylate and butyl acrylate as the major skeleton and has a functional group for adsorbing it onto the filler can be cited. The acryl-based polymer dispersant having a property with the acid number 0 to 23 mg KOH/g and the amine number 30 to 50 mg KOH/g is preferable. In many cases, a common acryl-based polymer dispersant has the amine number as described above and few of them have the acid number. The acryl-based polymer dispersant has good compatibility with an adhesive resin which includes an acrylic ester-based skeleton and has a carboxyl group as the functional group. Even if the dispersant is turned into the adhesive body, the optical property is not negatively affected.

d) Manufacturing of Dispersion Liquid for Near-Infrared-Absorbing Adhesive-Body

When the dispersion liquid for near-infrared-absorbing adhesive-body according to the present invention is manufactured, at least one types of oxide nanoparticles selected from the tungsten oxide and the composite tungsten oxide is dispersed in the above-described solvent to which the above-described dispersant has been added, with the average dispersed nanoparticle diameter equal to or smaller than 800 nm. As a dispersion process, the wet process is effective. In order to obtain an oxide nanoparticle with the average dispersed nanoparticle diameter equal to or smaller than 800 nm, dispersion milling by means of shear stress is effective, and preferably, a solvent, an inorganic near-infrared-absorbing material, and a dispersant are placed in dispersion milling equipment, where they underwent dispersion milling by means of shear stress. As examples of typical dispersion milling equipment, ball milling, sand milling, medium dispersion milling, ultrasonic irradiation or the like are cited.

2. Near-Infrared Absorbing Adhesive Body

The near-infrared-absorbing adhesive-body according to the present invention uniformly disperses at least one type of near-infrared-absorbing nanoparticles selected from the above-described tungsten oxide nanoparticle and the composite tungsten oxide nanoparticle, in an adhesive resin which includes an acrylic ester-based skeleton and has a carboxyl group as the functional group, with use of the above-described dispersion liquid for near-infrared-absorbing adhesive-body.

It is preferable that the above-described adhesive resin includes an acrylic ester-based skeleton. However, other than an acrylic ester-based adhesive resin, an urethane-based adhesive resin, a silicone-based adhesive resin, the mixture thereof, or the like may also be used. However, an adhesive resin having an acrylic ester-based skeleton is more preferable from the point of view of adhesion property, in the case of adhering base materials of different materials, such as a glass substrate and a polyester (hereinafter also referred to "PET") substrate each other in a PDP panel, with use of the near-infrared-absorbing adhesive-body.

Further, it is preferable that the adhesive resin has a carboxyl group as the functional group, since it has good compatibility with the tungsten oxide nanoparticle and the composite tungsten oxide nanoparticle, and whereby no aggregation or haze occurs.

3. Near-Infrared Absorbing PDP Filter and PDP Panel

The near-infrared-absorbing PDP filter is a laminated body which includes a base material, and a functional multi-layered film provided on the base material.

The near-infrared-absorbing adhesive-body according to the present invention is used, as an adhesive layer or an external force absorbing layer, on at least one of the interfaces selected from the interface between the base material and the functional multi-layered film and the interface between the functional multi-layered films in the laminated body. As a result, the adhesive layer or the external force absorbing layer, and the near-infrared-absorbing layer can exert their functions simultaneously as a single layer, although they have been separately provided so far.

Further, it is also possible to integrate the near-infrared-absorbing adhesive-body according to the present invention into a single layer which also works as the adhesive layer and the external force absorbing layer.

In addition, in the case where a mesh-like metal layer having the electromagnetic shielding function is embedded into the inside of the adhesive layer, the external force absorbing layer, and the adhesive and external force absorbing layer using the near-infrared-absorbing adhesive-body according to the present invention, it is also possible for the layer to have the electromagnetic shielding function in addition to the near-infrared absorbing function.

This structure is preferable since three types of functions: the adhesion function, the near-infrared absorbing function, and the electromagnetic shielding function can be achieved by a single layer.

Types or the like of the above-described mesh-like metal layer is not particularly specified, as long as it has the electromagnetic shielding function. As a typical example, a layer manufactured by processing metallic foils of Cu, Fe, Ni, Cr, Al, Au, Ag, W, Ti or the alloy thereof into a mesh-like shape, or a layer on which an ink in which conductive nanoparticles of carbon black, Cu, Ni or the like are dispersed in a binder resin is printed with a pattern in a mesh-like manner, or the like can be used.

In addition, the above-described mesh-like metal layer may be replaced by a metal-containing layer which has the electromagnetic shielding function.

A plasma display panel provided with the near-infrared-absorbing plasma-display-panel filter as described above exerts excellent optical property through simplification of the layered structure, and enables reduction in manufacturing cost, and therefore it is industrially advantageous.

EXAMPLES

Hereinafter, the present invention will be specifically described with reference to Examples. However, the present invention is not limited to these Examples.

Note that, in each Example, light transmittance was measured with use of the spectrophotometer U-4000 (manufactured by Hitachi, Ltd.) in the wavelength region from 300 nm to 2600 nm at intervals of 5 nm, in accordance with the method in JIS A 5759.

The haze value of the film was measured based on JIS A 7105.

The average particle diameter was measured by the measuring instrument (ELS-800 manufactured by Otsuka Electronics Co., Ltd.) using the dynamic light scattering method, and the average of the obtained values was determined as the measured value.

The film thickness of the adhesive body having the near-infrared shielding function was adjusted so that the maximum transmittance in the visible light wavelength range from 380 nm to 780 nm became approx. 60 to 70%.

Example 1

$Cs_{0.33}WO_3$ powders in amount of 10.0 parts by weight (manufactured by Sumitomo Metal Mining Co., Ltd.), 82.0 parts by weight of butyl acetate (manufactured by Kanto Chemical Co., Inc.), and 8.0 parts by weight of the acryl-based polymer dispersant (the amine number: 36 mg KOH/g, the solid content: 50%) were mixed, and then dispersion milling processing was performed with use of a paint shaker, whereby a dispersion liquid for near-infrared-absorbing adhesive-body (Liquid A) having the average particle diameter 80 nm was obtained.

Liquid A in amount of 24.7 parts by weight, acrylic ester adhesive resin in amount of 75.3 parts by weight (nonvolatile components in amount of 23.0 parts by weight, mixture solution of ethyl acetate, methylethylketone and toluene in amount of 77.0 parts by weight; viscosity 2.3 Pa·s (25° C.); having a carboxyl group as the major functional group) and a curing agent were mixed, whereby a near-infrared-absorbing adhesive-body (adhesive body B) was prepared.

The adhesive body B had excellent transparency without cloudiness by visual evaluation, and $Cs_{0.33}WO_3$ was uniformly dispersed therein. The adhesive body B was applied onto a PET film (manufactured by Teijin DuPont Films; HPE thickness 50 μm) with use of an applicator, and a film was formed. The film thickness of the thus obtained adhesive body was adjusted so that the maximum transmittance in the visible light wavelength range from 300 nm to 780 nm became approx. 70 to 80%. The adhesive body was heat treated at 80° C. for 2 minutes, and subsequently the PET film was adhered onto a glass substrate with use of the layer of the adhesive body B.

When the optical property of the layer of the adhesive body B was measured, visible light transmittance was 73.5% and haze value was 1.5%, from which it was found that the adhesive body sufficiently transmitted visible light and kept high transparency. On the other hand, the near-infrared transmittance in the wavelength range from 1200 nm to 1800 nm was equal to or smaller than 10%, from which it was found that the layer had excellent near-infrared absorbing function.

Note that, for the purpose of comparison, liquid A in amount of 24.7 parts by weight and acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body B*) was prepared. As a result, it was revealed that the adhesive body B* became clouded.

Example 2

A dispersion liquid for near-infrared-absorbing adhesive-body (Liquid C) was obtained by performing a similar operation as that in Example 1, except that a dispersant with the amine number 45 mg KOH/g was used as the acryl-based polymer dispersant.

A near-infrared-absorbing adhesive-body (adhesive body D) was prepared by performing a similar operation as that in Example 1 with use of the Liquid C.

The adhesive body D had excellent transparency without cloudiness by visual evaluation, and $Cs_{0.33}WO_3$ was uniformly dispersed therein. A layer of the adhesive body D was prepared by performing a similar operation as that in Example 1 with use of the adhesive body D. As a result, a layer which has excellent transparency without cloudiness could be obtained.

Note that, for the purpose of comparison, liquid C in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body D*) was prepared. As a result, it was revealed that the adhesive body D* became clouded.

Example 3

$Cs_{0.33}WO_3$ powders in amount of 20 parts by weight (manufactured by Sumitomo Metal Mining Co., Ltd.), isobutyl acetate in amount of 82.0 parts by weight (manufactured by Kanto Chemical Co., Inc.) and acryl-based polymer dispersant in amount of 16.0 parts by weight (the amine number 45 mg KOH/g, the solid content 50%) were mixed, and then dispersion milling processing was performed with use of a paint shaker, whereby a dispersion liquid for near-infrared-absorbing adhesive-body (Liquid E) having the average particle diameter 80 nm was obtained.

Liquid E in amount of 24.7 parts by weight, acrylic ester adhesive resin in amount of 75.3 parts by weight (nonvolatile components in amount of 23.0 parts by weight, the mixture solution of ethyl acetate, methylethylketone and toluene in amount of 77.0 parts by weight; viscosity 2.3 Pa·s (25° C.); having a carboxyl group as the major functional group) and a curing agent were mixed, whereby a near-infrared-absorbing adhesive-body (adhesive body F) was prepared.

The adhesive body F has excellent transparency without cloudiness, and it was confirmed by visual check that $Cs_{0.33}WO_3$ was uniformly dispersed therein.

The adhesive body F was applied onto a PET film (manufactured by Teijin DuPont Films: HPE thickness 50 μm) with use of an applicator, and a film was formed. The film thickness of the formed film was adjusted so that the maximum transmittance in the visible light wavelength range from 300 nm to 780 nm became approx. 70 to 80%. The formed film was heat treated at 80° C. for 2 minutes, and subsequently the PET film was adhered onto a glass substrate with use of a layer of the adhesive body F.

The optical property of the layer of the adhesive body F is shown in FIG. 1. FIG. 1 is a graph showing light transmittance in the vertical axis, and light wavelength in the horizontal axis. As apparent from FIG. 1, the layer of the adhesive body F sufficiently transmits visible light and keeps high transparency. In the meantime, visible light transmittance was 73.5%, and haze value was 1.5%. On the other hand, the near-infrared transmittance in the wavelength range from 1200 nm to 1800 nm was equal to or smaller than 10%, from which it was also revealed that the layer has excellent near-infrared absorbing function.

Note that, for the purpose of comparison, liquid E in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body F*) was prepared. As a result, it was revealed that the adhesive body F* became clouded.

Example 4

A dispersion liquid for near-infrared-absorbing adhesive-body (Liquid G) was obtained by performing a similar operation as that in Example 3, except that an acryl-based polymer dispersant with the amine number 50 mg KOH/g was used.

A near-infrared-absorbing adhesive-body (adhesive body H) was prepared by performing a similar operation as that in Example 3 with use of the Liquid G.

The adhesive body H had excellent transparency without cloudiness by visual evaluation, and $Cs_{0.33}WO_3$ was uniformly dispersed therein. A layer of the adhesive body H was prepared by performing a similar operation as that in Example 1 with use of the adhesive body H. As a result, a layer which has excellent transparency without cloudiness could be obtained.

Note that, for the purpose of comparison, liquid G in amount of 24.7 parts by weight, acrylic ester adhesive resin in amount of 75.3 parts by weight (nonvolatile components in amount of 24.1 parts by weight, mixture solution of ethyl acetate, methylethylketone and toluene in amount of 77.0 parts by weight; viscosity 2.3 Pass (25° C.); having a hydroxyl group as the major functional group) and a curing agent were mixed, whereby a near-infrared-absorbing adhesive-body (adhesive body H*) was prepared. As a result, it was revealed that the adhesive body H* became clouded.

Example 5

A dispersion liquid for near-infrared-absorbing adhesive-body (Liquid I) was obtained by performing a similar operation as that in Example 3, except that a dispersant with the acid number 20 mg KOH/g and the amine number 45 mg KOH/g was used the acryl-based polymer dispersant. A near-infrared-absorbing adhesive-body (adhesive body J) was prepared by performing a similar operation as that in Example 3 with use of the Liquid I.

The adhesive body J had excellent transparency without cloudiness by visual evaluation, and $Cs_{0.33}WO_3$ was uniformly dispersed therein. A layer of the adhesive body J was prepared by performing a similar operation as that in Example 1 with use of the layer of the adhesive body J. As a result, an adhesive body which has excellent transparency without cloudiness was able to be obtained.

Note that, for the purpose of comparison, liquid I in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body J*) was prepared. As a result, it was revealed that the adhesive body J* became clouded.

Example 6

A dispersion liquid for near-infrared-absorbing adhesive-body (Liquid K) was obtained by performing a similar operation as that in Example 3, except that a dispersant with the amine number 42 mg KOH/g was used as the acryl-based polymer dispersant.

A near-infrared-absorbing adhesive-body (adhesive body L) was prepared by performing a similar operation as that in Example 3 with use of the Liquid K.

The adhesive body L had excellent transparency without cloudiness by visual evaluation, and $Cs_{0.33}WO_3$ was uniformly dispersed therein. A layer of the adhesive body L was prepared by performing a similar operation as that in Example 1 with use of the layer of the adhesive body L. As a result, an adhesive body which has excellent transparency without cloudiness could be obtained.

Note that, for the purpose of comparison, liquid K in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body L*) was prepared. As a result, it was revealed that the adhesive body L* became clouded.

A dispersion liquid for near-infrared-absorbing adhesive-body (Liquid M) was obtained by performing a similar operation as that in Example 3, except that an acryl-based copolymer with the amine number 30 mg KOH/g having affinity with a pigment was used as the acryl-based polymer dispersant.

A near-infrared-absorbing adhesive-body (adhesive body N) was prepared by performing a similar operation as that in Example 3 with use of the Liquid M.

The adhesive body N had excellent transparency without cloudiness by visual evaluation, and $Cs_{0.33}WO_3$ was uniformly dispersed therein. A layer of the adhesive body N was prepared by performing a similar operation as that in Example 1 with use of the adhesive body N. As a result, an adhesive body which had excellent transparency without cloudiness could be obtained.

Note that, for the purpose of comparison, liquid M in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body N*) was prepared. As a result, it was revealed that the adhesive body N* became clouded.

Example 8

A dispersion liquid for near-infrared-absorbing adhesive-body (Liquid O) was obtained by performing a similar operation as that in Example 3, except that the mixture solution of isobutyl acetate in amount of 51.2 parts by weight (manufactured by Kanto Chemical Co., Inc.) and butyl acetate in amount of 12.8 parts by weight (manufactured by Kanto Chemical Co., Inc.) was used as the solvent, and a dispersant with the amine number 45 mg KOH/g was used as the acryl-based polymer dispersant.

A near-infrared-absorbing adhesive-body (adhesive body P) was prepared by performing a similar operation as that in Example 3 with use of the Liquid O.

The adhesive body P had excellent transparency without cloudiness by visual evaluation, and $Cs_{0.33}WO_3$ was uniformly dispersed therein. A similar operation as that in Example 1 was performed with use of the adhesive body P, and the optical property a layer of the adhesive body P was measured. As a result, visible light transmittance was 74.1% and haze value was 1.3%, from which it was found that the adhesive body sufficiently transmitted visible light and kept high transparency. On the other hand, the near-infrared transmittance in the wavelength range from 1200 nm to 1800 nm was equal to or smaller than 10%, from which it was found that the layer had excellent near-infrared-absorbing function.

Note that, for the purpose of comparison, liquid O in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body P*) was prepared. As a result, it was revealed that the adhesive body P* became clouded.

Example 9

$Cs_{0.33}WO_3$ powders in amount of 18.5 parts by weight (manufactured by Sumitomo Metal Mining Co., Ltd.), methyl isobutyl ketone in amount of 63.0 parts by weight (manufactured by Kanto Chemical Co., Inc.), and acryl-based polymer dispersant in amount of 18.5 parts by weight (the amine number 42 mg KOH/g, the solid content 40%) were mixed, and then dispersion milling processing was performed with use of a paint shaker, whereby a dispersion liquid for near-infrared-absorbing adhesive-body (Liquid Q) was obtained with the average particle diameter 60 nm.

Liquid Q in amount of 24.7 parts by weight, acrylic ester adhesive resin in amount of 75.3 parts by weight (nonvolatile components in amount of 25.3 parts by weight, the mixture solution of ethyl acetate and methylethylketone in amount of 74.7 parts by weight; viscosity 5.9 Pa·s (25° C.); having a carboxyl group as the major functional group) and a curing agent were mixed, whereby a near-infrared-absorbing adhesive-body (adhesive body R) was prepared.

The adhesive body R had excellent transparency without cloudiness by visual evaluation, and $Cs_{0.33}WO_3$ was uniformly dispersed therein. The adhesive body R was applied on a PET film (manufactured by Teijin DuPont Films; HPE thickness 50 μm) with use of an applicator, and a film was formed. The film thickness of the formed film was adjusted so that the maximum transmittance in the visible light wavelength range from 300 nm to 780 nm became approx. 70 to 80%. After the formed film was heat treated at 90° C. for 3 minutes, and subsequently the PET film was adhered onto a glass substrate with use a layer of the adhesive body R.

When the optical property of the layer of the adhesive body R was measured, visible light transmittance was 74.7% and haze value was 1.3%, from which it was found that the adhesive body sufficiently transmitted visible light and kept high transparency. On the other hand, the near-infrared transmittance in the wavelength range from 1200 nm to 1800 nm was equal to or smaller than 10%, from which it was found that the layer had excellent near-infrared absorbing function.

Note that, for the purpose of comparison, liquid Q in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body R*) was prepared. As a result, it was revealed that the adhesive body R* became clouded.

Comparative Example 1

$Cs_{0.33}WO_3$ powders in amount of 10.0 parts by weight (manufactured by Sumitomo Metal Mining Co., Ltd.), isobutyl acetate in amount of 85.6 parts by weight (manufactured by Kanto Chemical Co., Inc.), and co-polymer-based polymer dispersant containing an acid group in amount of 4.4 parts by weight (the acid number 129 mg KOH/g, the solid content 79%) were mixed, and then dispersion milling processing was performed with use of a paint shaker, whereby a dispersion liquid for near-infrared-absorbing adhesive-body (Liquid S) having the average particle diameter 80 nm was obtained.

Liquid S in amount of 24.7 parts by weight, acrylic ester adhesive resin in amount of 75.3 parts by weight (nonvolatile components in amount of 23.0 parts by weight, the mixture solution of ethyl acetate, methylethylketone and toluene in amount of 77.0 parts by weight; viscosity 2.3 Pa·s (25° C.)) and a curing agent were mixed, whereby a near-infrared-absorbing adhesive-body (adhesive body T) was prepared.

The adhesive body T was clouded and inferior in transparency by visual evaluation, and aggregation of $Cs_{0.33}WO_3$ was observed.

Note that, for the purpose of comparison, liquid S in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body T*) was prepared. As a result, it was revealed that the adhesive body T* also became clouded.

Comparative Example 2

A dispersion liquid for near-infrared-absorbing adhesive-body (Liquid U) was obtained by performing a similar operation as that in Comparative Example 1, except that a copolymer-based polymer dispersant containing an acid group was substituted by a block co-polymer-based polymer dispersant containing an acid group (the acid number 95 mg KOH/g, the amine number 95 mg KOH/g, the solid content 90%).

A near-infrared-absorbing adhesive-body (adhesive body V) was prepared by performing a similar operation as that in Example 3 with use of the Liquid U.

The adhesive body V was clouded and inferior in transparency by visual evaluation, and aggregation of $Cs_{0.33}WO_3$ was observed.

Note that, for the purpose of comparison, liquid U in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body V*) was prepared. As a result, it was revealed that the adhesive body V* also became clouded.

Comparative Example 3

A dispersion liquid for near-infrared-absorbing adhesive-body (Liquid W) was obtained by performing a similar operation as that in Comparative Example 1, except that a co-polymer-based polymer dispersant containing an acid group was substituted by a co-polymer-based polymer dispersant having affinity with a pigment (the acid number 30 mg KOH/g, the amine number 20 mg KOH/g, the solid content 90%).

A near-infrared-absorbing adhesive-body (adhesive body X) was prepared by performing a similar operation as that in Example 3 with use of the Liquid W.

The adhesive body X was clouded and inferior in transparency by visual evaluation, and aggregation of $Cs_{0.33}WO_3$ was observed.

Note that, for the purpose of comparison, liquid W in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body X*) was prepared. As a result, it was revealed that the adhesive body X* also became clouded.

Comparative Example 4

A dispersion liquid for near-infrared-absorbing adhesive-body (Liquid Y) was obtained by performing a similar operation as that in Comparative Example 1, except that a co-polymer-based polymer dispersant containing an acid group was substituted by an ester phosphate-based surfactant.

A near-infrared-absorbing adhesive-body (adhesive body Z) was prepared by performing a similar operation as that in Example 3 with use of the Liquid Y.

The adhesive body Z was clouded and inferior in transparency by visual evaluation, and aggregation of $Cs_{0.33}WO_3$ was observed.

Note that, for the purpose of comparison, liquid Y in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body Z*) was prepared. As a result, it was revealed that the adhesive body Z* also became clouded.

Comparative Example 5

A dispersion liquid for near-infrared-absorbing adhesive-body (Liquid α) was obtained by performing a similar operation as that in Comparative Example 1, except that isobutyl acetate is substituted by propylene glycol ethyl ether acetate (PE-Ac) (manufactured by Kurary Co., Ltd.), and a co-polymer-based polymer dispersant containing an acid group was substituted by a co-polymer-based dispersant containing a basic functional group (the amine number 45 mg KOH/g, the solid content 90%).

A near-infrared-absorbing adhesive-body (adhesive body β) was prepared by performing a similar operation as that in Example 3 with use of the Liquid α.

The adhesive body β was clouded and inferior in transparency by visual evaluation, and aggregation of $Cs_{0.33}WO_3$ was observed.

Note that, for the purpose of comparison, liquid a in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body β*) was prepared. As a result, it was revealed that the adhesive body β* also became clouded.

Comparative Example 6

A dispersion liquid for near-infrared-absorbing adhesive-body (Liquid γ) was obtained by performing a similar operation as that in Comparative Example 1, except that isobutyl acetate was substituted by propylene glycol ethyl etheracetate (PE-Ac) (manufactured by Kurary Co., Ltd.), and a co-polymer-based polymer dispersant containing an acid group was substituted by a block co-polymer-based dispersant having affinity with a pigment (the amine number 57 mg KOH/g, the solid content 90%).

A near-infrared-absorbing adhesive-body (adhesive body δ) was prepared by performing a similar operation as that in Example 3 with use of the Liquid γ.

The adhesive body δ was clouded and inferior in transparency by visual evaluation, and aggregation of $Cs_{0.33}WO_3$ was observed.

Note that, for the purpose of comparison, liquid γ in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body δ*) was prepared. As a result, it was revealed that the adhesive body δ* also became clouded.

Comparative Example 7

A dispersion liquid for near-infrared-absorbing adhesive-body (Liquid ε) was obtained by performing a similar operation as that in Comparative Example 1, except that isobutyl acetate was substituted by propylene glycol methyl ether acetate (PGM-Ac) (manufactured by Kurary Co., Ltd.), and a co-polymer-based polymer dispersant containing an acid group was substituted by a co-polymer-based dispersant containing a basic functional group (the amine number 45 mg KOH/g, the solid content 90%).

A near-infrared-absorbing adhesive-body (adhesive body ζ) was prepared by performing a similar operation as that in Example 3 with use of the Liquid ε.

The adhesive body ζ was clouded and inferior in transparency by visual evaluation, and aggregation of $Cs_{0.33}WO_3$ was observed.

Note that, for the purpose of comparison, liquid ε in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body ζ*) was prepared. As a result, it was revealed that the adhesive body ζ* also became clouded.

Comparative Example 8

A dispersion liquid for near-infrared-absorbing adhesive-body (Liquid η) was obtained by performing a similar operation as that in Comparative Example 1, except that isobutyl acetate was substituted by propylene glycol methyl ether acetate (PGM-Ac) (manufactured by Kurary Co., Ltd.) and a co-polymer-based polymer dispersant containing an acid group was substituted by a block co-polymer-based dispersant having affinity with a pigment (the amine number 57 mg KOH/g, the solid content 90%).

A near-infrared-absorbing adhesive-body (adhesive body θ) was prepared by performing a similar operation as that in Example 3 with use of the Liquid θ.

The adhesive body θ was clouded and inferior in transparency by visual evaluation, and aggregation of $Cs_{0.33}WO_3$ was observed.

Note that, for the purpose of comparison, liquid η in amount of 24.7 parts by weight, acrylic ester adhesive resin in amount of 75.3 parts by weight (nonvolatile components in amount of 24.1 parts by weight, the mixture solution of ethyl acetate, methylethylketone and toluene in amount of 77.0 parts by weight; viscosity 2.3 Pa·s (25° C.); having a hydroxyl group as the major functional group) and a curing agent were mixed, whereby a near-infrared-absorbing adhesive-body (adhesive body θ*) was prepared. As a result, it was revealed that the adhesive body θ* also became clouded.

Table 1 shows a list of the general compositions and the appearance observation result of the near-infrared-absorbing adhesive-bodies according to Examples 1 to 9 and Comparative Examples 1 to 8.

TABLE 1

| | Solvent | Dispersant Skeleton component | Acid number | Amine number | Mixture with adhesive resin Resin with carboxyl group | Resin with hydroxyl group |
|---|---|---|---|---|---|---|
| Example1 | BuAc | Acryl-based polymer dispersant | — | 36 | Transparent | Cloudiness |
| Example2 | BuAc | Acryl-based polymer dispersant | — | 45 | Transparent | Cloudiness |
| Example3 | isoBuAc | Acryl-based polymer dispersant | — | 45 | Transparent | Cloudiness |
| Example4 | isoBuAc | Acryl-based polymer dispersant | — | 50 | Transparent | Cloudiness |
| Example5 | isoBuAc | Acryl-based polymer dispersant | 20 | 45 | Transparent | Cloudiness |
| Example6 | isoBuAc | Acryl-based polymer dispersant | — | 42 | Transparent | Cloudiness |
| Example7 | isoBuAc | Acryl-based co-polymer having affinity with pigment | — | 30 | Transparent | Cloudiness |
| Example8 | isoBuAc/BuAc | Acryl-based polymer dispersant | — | 45 | Transparent | Cloudiness |
| Example9 | MIBK | Acryl-based polymer dispersant | — | 42 | Transparent | Cloudiness |
| Comparative Example 1 | isoBuAc | Co-polymer containing acid group | 129 | — | Cloudiness | Cloudiness |
| Comparative Example 2 | isoBuAc | Block co-polymer containing acid group | 95 | 95 | Cloudiness | Cloudiness |
| Comparative Example 3 | isoBuAc | Co-polymer having affinitiy with pigment | 30 | 20 | Cloudiness | Cloudiness |
| Comparative Example 4 | isoBuAc | Ester phosphate-based surfactant | — | — | Cloudiness | Cloudiness |
| Comparative Example 5 | PE-Ac | Co-polymer containing a basic functional group | — | 45 | Cloudiness | Cloudiness |
| Comparative Example 6 | PE-Ac | Block co-polymer having affinity with pigment | — | 57 | Cloudiness | Cloudiness |
| Comparative Example 7 | PGM-Ac | Co-polymer containing a basic functional group | — | 45 | Cloudiness | Cloudiness |
| Comparative Example 8 | PGM-Ac | Block co-polymer having affinity with pigment | — | 57 | Cloudiness | Cloudiness |

SUMMARY

In Examples 1 to 6, the adhesive bodies were obtained by mixing dispersion liquids (A, C, E, G, I, K) prepared from $Cs_{0.33}WO_3$, an acryl-based polymer dispersant, and butyl acetate or isobutyl acetate with an adhesive resin having a carboxyl group as the major functional group. The thus obtained adhesive bodies had good dispersing performance of $Cs_{0.33}WO_3$ in an adhesive resin, and exerted high visible light transmittance while no aggregation or haze was generated. On the other hand, the adhesive bodies sufficiently absorbed light in the near-infrared region. Further, it was confirmed that the adhesive bodies (B, D, F, H, J, L) had adequate adhesive force, and the PDP panels in which the adhesive bodies were used as the adhesive layers of the near-infrared-absorbing PDP filter were excellent in optical property and weather resistance, and that manufacturing cost thereof was able to be reduced.

On the other hand, it was also revealed that the adhesive bodies became clouded, in the case where the adhesive bodies (B*, D*, F*, H*, J*, L*) were obtained by mixing the dispersion liquids (A, C, E, G, I, K) with an adhesive resin which has a hydroxyl group as the major functional group.

As is the cases with Examples 1 to 6, it was also possible to obtain the adhesive bodies (N, P, R) which are optimal as the adhesive layer of the near-infrared-absorbing PDP filter, by mixing, with an adhesive resin having a carboxyl group as the major functional group, the dispersion liquid M (Example 7) using acryl-based co-polymer having affinity with pigment as a dispersant, the dispersion liquid O (Example 8) using butyl acetate and isobutyl acetate as the solvent in a mixed manner, or the dispersion liquid Q (Example 9) using methyl isobutyl ketone, respectively.

On the other hand, it was also revealed that adhesive bodies became clouded in the case where the adhesive bodies (N*, P*, R*) were obtained by mixing the dispersion liquids (M, O, Q) with an adhesive resin which has a hydroxyl group as the major functional group.

On the contrary, the dispersion liquids (S, U, W, Y) according to Comparative Examples 1 to 4 use dispersants other than acryl-based polymers, although they use similar solvents as in Examples 3 to 7. Therefore, aggregation and cloudiness of $Cs_{0.33}WO_3$ were generated, both in the case where an adhesive resin having a carboxyl group is used (T, V, X, Z) and in the case where an adhesive resin having a hydroxyl group is used (T*, V*, X*, Z*), which caused problems in terms of optical property.

Accordingly, in the dispersion liquids according to Comparative Examples 5 to 8 ($\alpha$, $\gamma$, $\epsilon$, $\eta$), the solvents were substituted by propylene glycol ethyl ether acetate and by propylene glycol methyl ether acetate, respectively, and the dispersants were also substituted by co-polymers which contain a basic functional group and block co-polymers which have affinity with a pigment, respectively. However, aggregation and cloudiness of $Cs_{0.33}WO_3$ were generated with the dispersion liquids according to Comparative Examples 5 to 8, both in the case of mixture with an adhesive resin having a carboxyl group ($\beta$, $\delta$, $\zeta$, $\theta$) and in the case of mixture with an adhesive resin having a hydroxyl group ($\beta^*$, $\delta^*$, $\zeta^*$, $\theta^*$), which caused the problem in terms of optical property.

BRIEF DESCRIPTION OF DRAWINGS

FIG. 1 is a graph showing an optical property of the layer of the adhesive body according to Example 3.

The invention claimed is:

1. A dispersion liquid for near-infrared-absorbing adhesive-body, the dispersion liquid comprising; in a solvent, one or more types of oxide nanoparticles selected from a tungsten oxide nanoparticle and a composite tungsten oxide nanoparticle; and an acryl-based polymer dispersant, wherein
the average dispersed nanoparticle diameter of the oxide nanoparticles is equal to or smaller than 800 nm, and
the acryl-based polymer dispersant is adsorbed onto the surfaces of the oxide nanoparticles to disperse and stabilize the oxide nanoparticles through steric hindrance of the acryl-based polymer dispersant.

2. The dispersion liquid for near-infrared-absorbing adhesive-body according to claim 1, wherein the solvent has one or more types of solvents selected from ketones, esters, hydrocarbons and ethers.

3. The dispersion liquid for near-infrared-absorbing adhesive-body according to claim 1, wherein the tungsten oxide nanoparticle is a nanoparticle of a tungsten oxide expressed by the general formula WyOz (where W denotes tungsten and O denotes oxygen, satisfying $2.2 \leq z/y \leq 2.999$).

4. The dispersion liquid for near-infrared-absorbing adhesive-body according to claim 1, wherein the composite tungsten oxide nanoparticle is a nanoparticle of a composite tungsten oxide expressed by the general formula MxWyOz (where the element M denotes one or more types of elements selected from H, He, alkali metals, alkaline earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, where W denotes tungsten and O denotes oxygen, satisfying $0.001 \leq z/y \leq 1.1$, $2.2 \leq z/y \leq 3.0$).

5. The dispersion liquid for near-infrared-absorbing adhesive-body according to claim 1, wherein the tungsten oxide nanoparticle contains a Magneli phase with a relative proportion expressed by the general formula WyOz (where W denotes tungsten and O denotes oxygen, $2.45 \leq z/y \leq 2.999$).

6. A near-infrared-absorbing adhesive-body wherein the dispersion liquid according to claim 1 is dispersed in an adhesive resin.

7. The near-infrared-absorbing adhesive-body according to claim 6, wherein the adhesive resin includes an acrylic ester-based skeleton and has a carboxyl group as a functional group.

8. A near-infrared-absorbing plasma-display-panel filter, comprising:
one or more types of layers selected from an adhesive layer and an external force absorbing layer made of the near-infrared-absorbing adhesive-body according to claim 6, between a base material and a laminated body provided with a functional multi-layered film on a surface of the base material, or between laminated bodies each of which is provided with a functional multi-layered film on a surface of the base material.

9. A near-infrared-absorbing plasma-display-panel filter, comprising a mesh-like metal layer having an electromagnetic shielding function in one or more types of the layers selected from the adhesive layer and the external force absorbing layer according to claim 8.

10. A plasma display panel comprising the near-infrared-absorbing plasma-display-panel filter according to claim 8.

11. The dispersion liquid for near-infrared-absorbing adhesive-body according to claim 1, wherein the acryl-based polymer dispersant has a co-polymer of ethyl acrylate and butyl acrylate as the major skeleton, and a property with an acid number from 0 to 23 mg KOH/g and an amine number from 30 to 50 mg KOH/g.

* * * * *